United States Patent
Braune et al.

(10) Patent No.: US 6,940,060 B2
(45) Date of Patent: Sep. 6, 2005

(54) MONITORING METHOD AND OPTOELECTRONIC SENSOR

(75) Inventors: Ingolf Braune, Gundelfingen (DE); Olaf Henkel, Reute (DE)

(73) Assignee: Sick AG, Waldkirch/Breisgau (DE)

( * ) Notice: Subject to any disclaimer, the term of this patent is extended or adjusted under 35 U.S.C. 154(b) by 302 days.

(21) Appl. No.: 10/235,250

(22) Filed: Sep. 4, 2002

(65) Prior Publication Data

US 2003/0075675 A1 Apr. 24, 2003

(30) Foreign Application Priority Data

Sep. 5, 2001 (DE) .......................................... 101 43 504

(51) Int. Cl.$^7$ ................................................ H01J 40/14
(52) U.S. Cl. ..................... 250/222.1; 340/555; 340/556
(58) Field of Search ........................... 250/221, 222.1, 250/559.31, 559.39, 559.4; 340/541, 555–557

(56) References Cited

U.S. PATENT DOCUMENTS

| | | | | |
|---|---|---|---|---|
| 5,789,739 A | * | 8/1998 | Schwarz | 250/221 |
| 6,075,238 A | * | 6/2000 | Fembok | 250/221 |
| 6,175,106 B1 | * | 1/2001 | Buitkamp et al. | 250/221 |
| 6,362,468 B1 | * | 3/2002 | Murakami et al. | 250/221 |
| 6,720,874 B2 | * | 4/2004 | Fufido et al. | 340/541 |
| 6,737,970 B2 | * | 5/2004 | Wuestefeld et al. | 340/552 |
| 2002/0196155 A1 | * | 12/2002 | McNulty | 340/686.1 |
| 2003/0047672 A1 | * | 3/2003 | Henkel et al. | 250/221 |

FOREIGN PATENT DOCUMENTS

| | | |
|---|---|---|
| DE | 4405849 A1 | 9/1994 |
| DE | 19536297 A1 | 4/1997 |
| DE | 69127968 T2 | 11/1997 |
| DE | 19749435 A1 | 5/1999 |
| DE | 19809210 A1 | 9/1999 |
| EP | 0985903 A2 | 3/2000 |

* cited by examiner

*Primary Examiner*—Stephone B. Allen
*Assistant Examiner*—Davienne Monbleau
(74) *Attorney, Agent, or Firm*—Townsend and Townsend and Crew LLLP

(57) ABSTRACT

A zone is monitored with an optoelectronic sensor. Light is transmitted in accordance with a structured light pattern in the direction of the monitored zone and is received from the monitored zone. The received light is converted into received signals and the received signals are evaluated with respect to the presence of an object, or with respect to a movement of an object, in the monitored zone. The light is transmitted and/or received in accordance with at least two different light patterns.

31 Claims, 2 Drawing Sheets

MONITORING METHOD AND OPTOELECTRONIC SENSOR

BACKGROUND OF THE INVENTION

The invention relates to a method of monitoring a monitored zone by means of an optoelectronic sensor, wherein transmitted light is transmitted in accordance with a structured light pattern in the direction of the monitored zone and is received from the monitored zone, the received light is converted into received signals and the received signals are evaluated with respect to the presence of an object, or with respect to a movement of an object, in the monitored zone. The invention further relates to a corresponding optoelectronic sensor.

Such a monitoring method and such a sensor serve, for example, for the securing of the monitored zone against an unauthorized intervention, that is, in that a switching off signal, or a warning signal, is generated if the presence of an object, or the movement of such an object, is detected in the monitored zone.

For this purpose, the monitored zone is actively illuminated with the transmitted light and the transmitted light received from the monitored zone is recorded by means of a reception device, for example by means of a CCD camera. The corresponding received signals of this reception device are compared with thresholds or with received signals which were determined and stored at an earlier time. A conclusion can be drawn from these on changes having taken place in the interim within the monitored zone.

With homogeneous objects, that is, objects which have only a low visual contrast themselves and in relation to the background, the problem can arise that an introduction of such objects into the monitored zone is not recognized without error. To avoid this problem, a structured light pattern is worked with, i.e. the transmitted light is transmitted in accordance with a light/dark pattern, and/or the transmitted light is recorded on the receiver side in accordance with such a light/dark pattern. When such a light pattern is used, for example with a triangulation arrangement of the transmission device and the reception device, the displacement of a homogeneous object can also be recognized. This procedure can, however, in turn bring about the disadvantage that the reception device cannot reliably be checked as to its functional ability (c.f. FIGS. 3 to 5).

SUMMARY OF THE INVENTION

It is an object of the invention to increase the reliability, for a monitoring method or for an optoelectronic sensor working with a structured light pattern, both with respect to the detection of homogeneous objects and with respect to a check of the functional ability of the reception device.

This object is attained in that the transmitted light is transmitted and/or received in accordance with at least two different light patterns.

A plurality of different light patterns are used with the invention. The observation of the monitored zone can thereby take place with a high degree of accuracy. Since, namely, in accordance with the invention, ultimately all regions or elements of the reception device can come into use by the use of a plurality of different light patterns, the sensor can be operated with a correspondingly higher spatial resolution. On the evaluation of the received signals for the plurality of light patterns, those recorded images or received signals—or their features—can respectively be compared with one another for this purpose which were recorded for the same light pattern, as will be explained in the following.

By the use of a plurality of different light patterns within the same monitoring operation, not only a homogeneous object can—as desired—be recognized within the monitored zone. Rather, the reception device can also be completely tested as to its functional ability, that is, in that the plurality of light patterns are used as the basis for the test. The different light patterns can be selected for this purpose such that ultimately all regions or individual elements of the reception device are acted upon by received transmitted light such that a check can be made of all regions or elements as to whether any received signal is output at all. In contrast, such a test cannot be carried out with the same reliability with known monitoring methods since, due to the use of a single structured light pattern, some regions or elements of the reception device cannot be acted upon by transmitted light and thus no statement can be made on the functional ability of these regions or reception elements.

The light patterns are, to the extent that an object with the monitored zone or the reception device of the sensor is acted upon by transmitted light, light/dark patterns. The transitions between light and dark regions of this pattern can here substantially extend continuously or be substantially sharply bounded.

It must still be noted with respect to the invention that it is not restricted to transmitted light of the optical range, but that an operation is also possible in the infrared or ultraviolet range.

With respect to the explained advantage of a test of the reception device which is as complete as possible and of an increased resolution, it is preferred for the light patterns to be structured in a manner fully complementary to one another. In other words, the light patterns—on the transmission side and/or on the reception side—should be used such that, by successive use of all light patterns—in particular with an object-free monitored zone—ultimately generally all regions or elements of the reception device are acted upon by transmitted light from the monitored zone.

The light patterns can have a regular or irregular structure. Furthermore, a linear shape or a matrix shape is possible for the light patterns. The light patterns can also be defined by polygonal forms or have free shapes.

It is furthermore preferred for the different light patterns to be employed or used alternately. In other words, the recorded images or the received signals required for the evaluation should be determined in an unchanging sequence in order to be able to compare the recorded images or received signals continuously with images recorded earlier, or with their processed data or received signals. Moreover, it is achieved by such an alternating use of the different light patterns that the time interval between the use of the same respective light pattern is the same for all light patterns so that a movement of an object in the monitored zone makes itself noticeable in substantially the same manner with respect to the evaluation of the respective received signals.

It is possible for the production of the different light patterns to provide a respectively separately associated transmission device, with the plurality of transmission devices being able to be controlled alternately.

Alternatively or additionally, different optical transmission systems and/or optical reception systems can be provided for the different light patterns which alternately image the transmitted light in the monitored zone or from the monitored zone respectively.

It is also possible for one or more optical transmission systems and/or one or more optical reception systems—to be moved between different positions which each correspond to a light pattern. For example, a displacement or tilting of the respective optical system can be used. It is also possible for the generation of the different light patterns to deflect the transmitted light beam on the transmission side and/or on the reception side to different optical axes, for example by means of a tiltable mirror.

It is also possible for a separately associated reception device to be provided in each case for the realization of the different light patterns.

As already explained, a test can be carried out as to whether the reception device, in particular all regions or elements of the reception device, is working without error. For this purpose, received signals can be determined with an activated transmission device, on the one hand, and with a deactivated transmission device, on the other hand, and these received signals can be compared with one another or processed by means of suitable algorithms. If such a comparison shows that the received signals do not differ from one another, or do not differ sufficiently from one another, a defect of the corresponding region or element of the received device can be concluded. As already explained, it is of particular advantage if such a test is carried out for a plurality of different light patterns such that all regions or all elements of the reception device are detected.

The invention will be described by way of example in the following with reference to the drawings.

DESCRIPTION OF THE PREFERRED EMBODIMENTS

Figure 3:
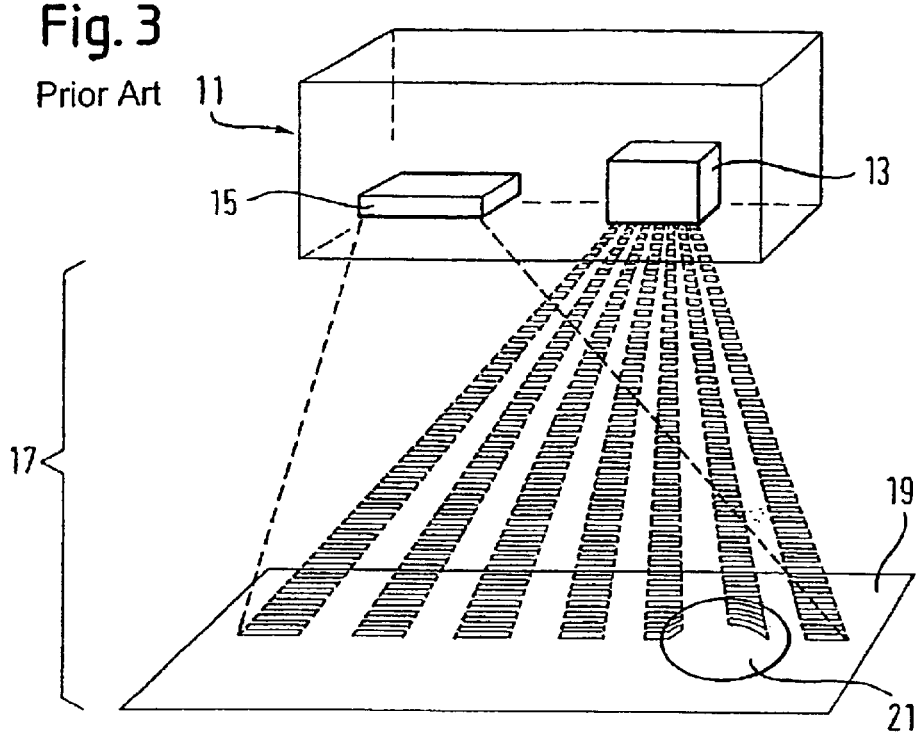
FIG. 3 shows a sensor made in accordance with the prior art.

FIG. 3 shows a known optoelectronic sensor 11 with a transmission device 13 and a reception device 15 with a plurality of reception elements. The transmission device 13 emits transmitted light in accordance with a structured light pattern in the direction of the monitored zone 17.

The monitored zone 17 is bounded by a background 19. An object 21 is located within the monitored zone 17. The transmitted light reflected from the monitored zone 17, that is, from the object 21 or from the background 19, is detected by the reception device 15.

Figure 4:
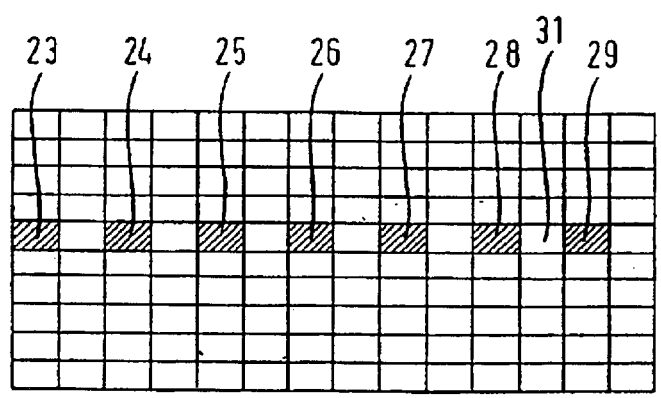
FIGS. 4 and 5 show light patterns of the sensor of FIG. 3.

FIG. 4 shows the image which the reception device 15 records with an object-free monitored zone and converts into corresponding reception signals. The shown scan of this image results from the corresponding division of the transmission device 13. Provided there is no object 21 in the monitored zone 17, the reception device 15 is acted upon by reflected transmitted light in accordance with the structured light pattern with pattern regions 23 to 29 drawn in hatched form (in FIGS. 3 to 5).

If the functional ability of the reception device 15 should be tested in this object-free state of the monitored zone 17, such a test can ultimately only be carried out reliably on the basis of the pattern regions 23 to 29. A comparison can thus be made with those received signals which are determined with a deactivated transmission device 13 only for those reception elements of the reception device 15 which correspond with respect to their arrangement to the pattern regions 23 to 29 or which image the pattern regions 23 to 29. Information on whether the reception element in question is converting received light into a corresponding received signal at all can only be obtained for these reception elements.

If, in contrast, as shown in FIG. 3, an object 21 is located within the monitored zone 17, the illuminated pattern regions, and thus the light exposure of the corresponding reception elements of the reception device 15, are displaced. This is due to the fact that the sensor 11 works according to the triangulation principle, in which the optical axes of the transmitted light beam and of the received light do not extend parallel, but at an angle to one another, such that a change in the distance of the reflecting object 21 results in a displacement of the light spot on the reception side.

Figure 5:
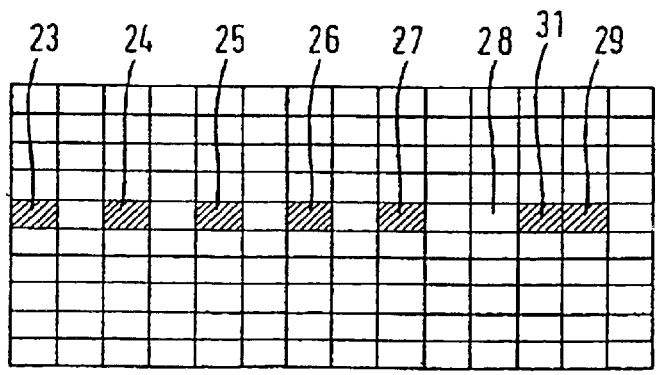

As a result of these circumstances, the presence of the object 21 shown in FIG. 3 within the monitored zone 17 can result in a light pattern as shown in FIG. 5. The background 19 is here acted upon by the transmitted light instead of the pattern region 28 at the adjacent pattern region 31. This effect is generally desired since the presence of the object 21 in the monitored zone 17 can be detected from this change—for example by a comparison with a previous image, as shown in FIG. 4.

However, the reception element, which corresponds to the pattern region 31 and is consequently now acted upon by light, is one of those reception elements for which, with an object-free monitored zone 17, no reliable function test could be carried out in the manner described above. In other words, this reception element now acted upon by light could be defective, without this being able to be recognized before the actual monitoring operation of the sensor 11. This can have the result that the displacement of the light exposure shown in FIGS. 4 and 5 from the pattern region 28 to the pattern region 21 is not recognized and thus the presence of the object 21 is erroneously ignored.

This deficiency is eliminated by the invention, as will be explained in the following with reference to FIG. 1a and FIGS. 2a and 2b.

Figure 1:
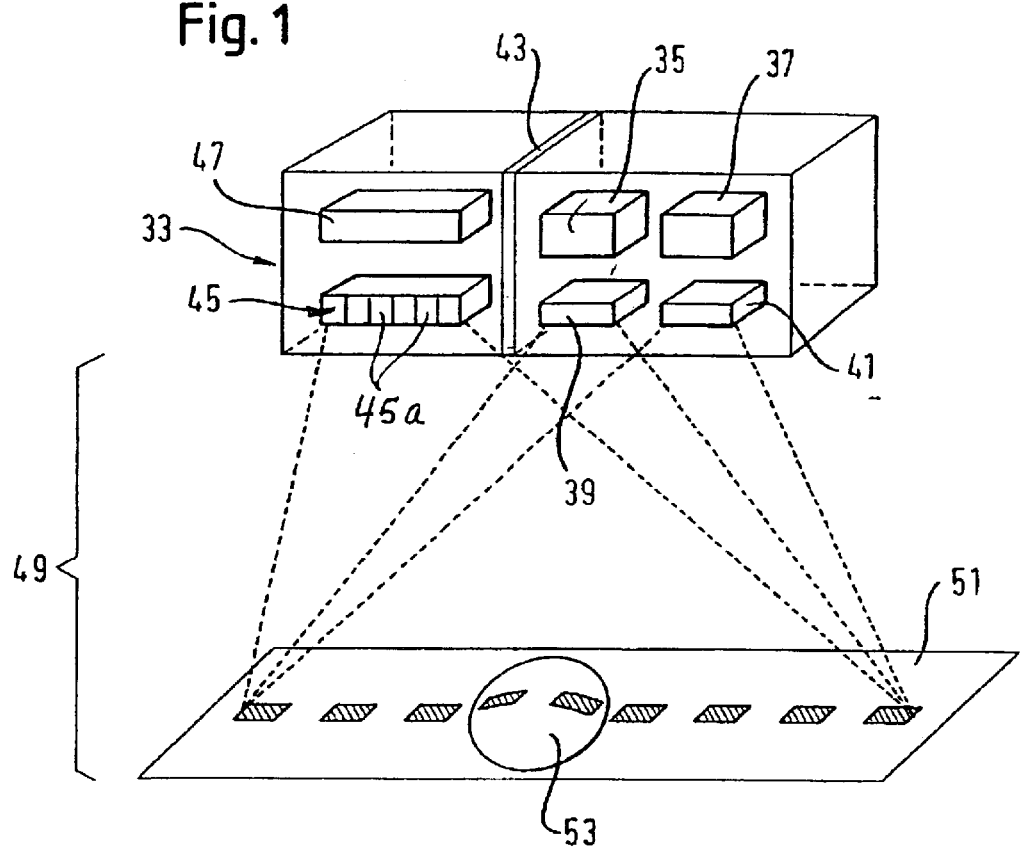
FIG. 1 is a schematic perspective view of an optoelectronic sensor in accordance with the invention.

The optoelectronic sensor 33 shown in FIG. 1 has two transmission devices 35, 37, with which a respective diffractive optical element 39 or 41 respectively is associated as an optical transmission system. The transmission devices 35, 37 are formed, for example, by laser diodes.

The sensor 33 further has, separated from the transmission devices 35, 37 by a partition wall 43, a reception device 45 which is formed, for example, by a CCD camera. Moreover, the sensor 33 contains a control and evaluation device 47.

Transmitted light is transmitted by the transmission devices 35, 37 in the direction of a monitored zone 49 which is bounded by a background 51. In this connection, the respectively associated diffractive optical element 39 or 41 has the effect that the transmitted light is structured in accordance with a light pattern. This transmitted light is reflected by the background 51 or by an object 53 located within the monitored zone 49 and detected via an optical reception system (not shown) by the reception device 45.

The reception device 45 has a plurality of reception elements 45a to be able to resolve the structure of the light transmitted, reflected and detected in accordance with one of the light patterns, as already explained with reference to FIGS. 4 and 5. The reception device 45 converts the received light—reception element by reception element—into received signals and forwards them to the control and evaluation device 47.

Figure 2A:
FIGS. 2, 2b and 2c show different light patterns.
Figure 2B:

FIGS. 2a and 2b show the two light patterns created by the diffractive optical elements 39 and 41 respectively, as they appear with an object-free monitored zone 49 at the background 51 or—after reflection—at the reception device 45. These light patterns are equi-distantly alternating, linear patterns. The two light patterns are, as the comparison in accordance with FIGS. 2a and 2b shows, phase-shifted by 180° with respect to one another. They are thus structured precisely complementarily to one another.

The sensor 33 in accordance with FIG. 1 allows the two following functions:

First, the presence of an object 53 within the monitored zone 49 can be detected. For this purpose, light is transmitted into the monitored zone 49 in accordance with the corresponding light pattern by means of one of the respective two transmission devices 35, 37 and detected by the reception device 45 after reflection. The received signals determined here, or their processed data, are compared by the control and evaluation device 47 with received signals, or their data, which have been determined and stored using the same transmission device 35 or 37 respectively—and thus using the same light pattern—at an earlier time. These comparison values can have been determined—before the actual monitoring operation of the sensor 33—during a calibration operation in which no object 53 has yet been arranged within the monitored zone 49. The presence of an object 53 can be detected in this manner.

Alternatively, the earlier time can be that time at which the transmission device 35 or 37 in question—and thus the corresponding light pattern—had last been activated to determine the corresponding received signals. With this procedure, a movement of an object 53 within the monitored zone 49, which has taken place in the interim, can be recognized.

In both cases, a respective threshold can be used as a basis for the comparison of the received signals with calibration values or with previously determined values by the control and evaluation device 47 in order only to output a warning signal, a switching off signal or an item detection signal in the event of a sufficiently large change.

This monitoring operation of the sensor 33 is carried out on the basis of both the light transmitted by the transmission device 35 and of the light transmitted by the transmission device 37, with the explained comparison with previous received signals being carried out in each case with respect to the same light pattern.

Second, a complete test of all relevant reception elements of the reception device 45 can be carried out with the sensor 33 in accordance with FIG. 1. For this purpose, the received signals of the reception device 45 are determined, on the one hand, when light is transmitted from one of the transmission devices 35 or 37 and acts upon the reception device 45 after reflection. This takes place in particular—but not necessarily—with an object-free monitored zone 49. On the other hand, the received signals of the reception device 45 can additionally be determined while neither of the transmission devices 35, 37 emits transmitted light. The respectively received signals corresponding to one another, i.e. the received signals of the same reception element of the reception device 45 in each case, are compared with one another. If there is a sufficient difference, a conclusion can be drawn that the reception element in question is functional.

As a result of the design of the light patterns in accordance with FIGS. 2a and 2b complementary to one another, all reception elements of the reception device 45 are thus tested as to their functional ability which are also used for the actual monitoring operation of the sensor 33.

The following procedures are, for example, possible for the two explained functions of the sensor 33 (monitoring operation and test):

a) First, in a test phase, the reception elements of the reception device 45 are tested as to their functional ability in that, with an object-free monitored zone 49, received signals are determined with an activated transmission device 35, with an activated transmission device 37 or with deactivated transmission devices 35 and 37 and are compared with one another in the manner explained. Subsequently, the actual monitoring operation takes place in which the transmission devices 35 and 37—and thus the different light patterns in accordance with FIGS. 2a and 2b—are alternately activated, with a comparison taking place of the determined received signals with the received signals determined in the previous activation of the same transmission device 35 or 37 respectively after each activation of a transmission device 35, 37.

b) Or received signals are continuously determined during the monitoring operation with an activated transmission device 35, with an activated transmission device 37 and with deactivated transmission devices 35 and 37. The received signals which are determined with an activated transmission device 35 are compared with those received signals which were determined at the last activation of the same transmission device 35. A corresponding comparison is carried out after each activation of the other transmission device 37. After each detection of the received signals with deactivated transmission devices 35 and 37, the explained test of the reception elements is carried out; i.e. the control and evaluation device 37 compares these received signals with the respectively determined received signals with an activated transmission device 35 or with an activated transmission device 37.

In the two routines set forth by way of example, successive data are therefore produced on the image content in order to produce an item detection signal or a warning or switching off signal on significant differences.

In both cases, the transmitted light is preferably transmitted in transmitted pulses, with the generation of the received signals by means of the reception device 45 taking place in synchronization with the transmission of the transmitted pulses. This control is taken over by the control and evaluation device 47.

Figure 2C:
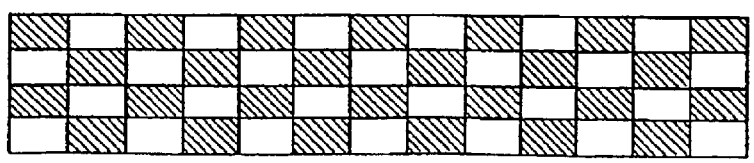

FIG. 2c shows a two-dimensional realization of the light pattern which is likewise possible. The invention can thereby also be used, as explained above for the monitoring of a three-dimensional region with the same advantages. For this purpose, a complementary two-dimensional light pattern can preferably be provided (not shown).

It must still be noted with respect to the invention that the received signals can additionally be evaluated with respect to the distance of an object 53 detected within the monitored zone 49 in order to output corresponding distance information. This distance information can be gained with a triangulation arrangement of the transmission devices 35, 37 and the reception device 45 on the basis of a difference of the pattern of the received light spots from the respectively emitted light pattern. A determination and taking into account of the distance of the background 51 from the sensor 33 can contribute to avoiding manipulations which could be caused, for example, in that a correspondingly encoded background is arranged closer to the sensor 33 so that unauthorized actions can be carried out behind this "false" background, which should actually be avoided by the sensor 33.

It must finally be noted that, in place of the reflection arrangement shown in FIG. 1, a transmitted light arrangement of the transmission devices 35, 37, on the one hand, and of the reception device 45, on the other hand, can be provided in which the transmitted light substantially passes through the monitored zone 49 in a straight line.

What is claimed is:

1. A method of monitoring a monitored zone by means of an optoelectronic sensor, wherein in accordance with a structured light pattern, transmitted light is transmitted in the direction of the monitored zone and is received from the monitored zone by a reception device;

the received light is converted into received signals; and the received signals are evaluated with respect to the presence of an object, or with respect to a movement of an object, in the monitored zone, wherein the transmitted light is transmitted and/or received in accordance with at least two different light patterns, the light patterns being structured in a complementary manner to each other so that, when the monitored zone is object-free, all regions of the reception device are acted upon by the received light.

2. A method in accordance with claim 1, characterized in that the light patterns have a regular structure, with the light patterns being equi-distantly alternating patterns.

3. A method in accordance with claim 1, characterized in that the light patterns are phase-shifted by 180° with respect to one another.

4. A method in accordance with claim 1, characterized in that the light patterns are linear or of matrix shape.

5. A method in accordance with claim 1, characterized in that the light patterns are light/dark patterns, with the transitions between light and dark regions being continuous or discontinuous.

6. A method in accordance with claim 1, characterized in that the at least two different light patterns are alternatively transmitted and/or received.

7. A method in accordance with claim 1, characterized in that the different light patterns are each produced by an associated transmission device.

8. A method in accordance with claim 1, characterized in that the different light patterns are produced by the use of different optical transmission systems.

9. A method in accordance with claim 1, characterized in that the transmitted light beam and/or a bundle of rays of the received light is deflected, shifted or tilted to produce the different light patterns.

10. A method in accordance with claim 1, characterized in that at least one light pattern is produced by the use of a diffractive optical element.

11. A method in accordance with claim 1, characterized in that transmitted light is received and evaluated which has been reflected or remitted from the monitored zone, or which has substantially passed through the monitored zone in a straight line.

12. A method in accordance with claim 1, characterized in that the transmitted light is transmitted in transmitted pulses, with the reception of the light from the monitored zone taking place in synchronization with the emitting of the transmitted pulses.

13. A method in accordance with claim 1, characterized in that, for the evaluation of the received light, the received signals determined for a specific light pattern, or the data processed from these received signals, are compared with received signals or data which were determined for the same light pattern at a previous time.

14. A method in accordance with claim 13, characterized in that the monitored zone was in an object-free calibration state at the previous time; or in that the previous time is the time of the directly preceding transmission and/or reception of the same light pattern.

15. A method in accordance with claim 1, characterized in that a test of an error-free reception of light is carried out by comparing the received signals with the transmitted light, wherein the received signals are compared with one another and/or with received signals which were generated when no transmitted light has been transmitted.

16. A method in accordance with claim 15, characterized in that the test is carried out for all different light patterns.

17. A method in accordance with claim 15, characterized in that the reception device has a plurality of reception elements, the received signals are compared with one another by a respective one of the reception elements; and/or in that a defective reception is detected if the respective reception signals do not differ from one another or differ from one another by less than a predetermined threshold.

18. A method in accordance with claim 15, characterized in that the test is carried out before the start of a subsequent monitoring operation of the optoelectronic sensor; and/or in that the test is carried out during a monitoring operation of the optoelectronic sensor at regular intervals.

19. A method in accordance with claim 1, characterized in that the method of securing the monitored zone against unauthorized intervention is used; and in that a switching off signal or a warning signal is produced if the presence of an object, or a movement of an object, in the monitored zone was detected as the result of an evaluation of the received signals.

20. A method in accordance with claim 1, characterized in that the received signals are additionally evaluated with respect to the distance of an object located within the monitored zone by taking into account a beam path which diverges due to a triangulation arrangement.

21. A method in accordance with claim 1, wherein the light patterns have an irregular structure.

22. An optoelectronic sensor for the monitoring of a monitored zone comprising at least one transmission device for the transmission of a structured transmitted light pattern in the direction of the monitored zone;

at least one reception device defining a plurality of regions for the conversion of light received from the monitored zone into received signals; and an evaluation device for the evaluation of the received signals with respect to the presence of an object, or a movement of an object, in the monitored zone, wherein at least one transmission device and/or the at least one reception device is formed for the transmission or reception of at least two different light patterns, and wherein the light patterns are structured in a complementary manner to each other so that, when the monitored zone is object-free, all regions of the reception device are acted upon by the received light.

23. A sensor in accordance with claim 22, characterized in that the transmission device and/or the reception device is formed for the alternating transmission or reception, respectively, of the different light patterns.

24. A sensor in accordance with claim 22, characterized in that a separate transmission device is provided for each light pattern.

25. A sensor in accordance with claim 22, characterized in that a respective separate transmission device is provided for the transmission of the different light patterns.

26. A sensor in accordance with claim 22, characterized in that the reception device has a plurality of reception elements.

27. A sensor in accordance with claim 22, characterized in that a displaceable or tiltable transmission device and/or reception device is provided.

28. A sensor in accordance with claim 22, characterized in that the transmission device and/or the reception device has at least one diffractive optical element.

29. A sensor in accordance with claim 22, characterized in that the transmission device and the reception device are arranged in a reflection arrangement or in a transmission arrangement.

30. A sensor in accordance with claim 22, characterized in that the received signals which are determined for a specific light pattern can be compared by the evaluation device with received signals which were determined at a previous time for the same light pattern.

31. A sensor in accordance with claim 22, characterized in that, for a test of an error-free reception of light, the received signals light are compared by the evaluation device with reception signals which are determined when no transmitted light was transmitted.

* * * * *